(12) United States Patent
Klang et al.

(10) Patent No.: US 9,384,667 B2
(45) Date of Patent: Jul. 5, 2016

(54) SCALAR PRODUCT BASED SPACING CALCULATION

(71) Applicant: Honeywell International Inc., Morristown, NJ (US)

(72) Inventors: Pavel Klang, Brno (CZ); Petr Casek, Brno (CZ); Silvie Luisa Brazdilova, Kurim (CZ)

(73) Assignee: Honeywell International Inc., Morris Plains, NJ (US)

( * ) Notice: Subject to any disclaimer, the term of this patent is extended or adjusted under 35 U.S.C. 154(b) by 47 days.

(21) Appl. No.: 14/334,332

(22) Filed: Jul. 17, 2014

(65) Prior Publication Data

US 2016/0019797 A1 Jan. 21, 2016

(51) Int. Cl.
*G08G 5/00* (2006.01)
*G01C 21/20* (2006.01)
*G01G 23/00* (2006.01)
*G01C 23/00* (2006.01)

(52) U.S. Cl.
CPC .............. *G08G 5/0047* (2013.01); *G01C 21/20* (2013.01); *G01C 23/005* (2013.01); *G08G 5/0021* (2013.01); *G08G 5/0052* (2013.01); *G08G 5/0073* (2013.01)

(58) Field of Classification Search
CPC ... G08G 5/003; G08G 5/0047; G08G 5/0073; G08G 5/0021; G08G 5/0039; G08G 5/0078; G08G 5/04–5/045; G01C 23/005; G01C 21/20; G01C 23/00
USPC ................ 701/3, 7, 8, 14, 300, 301; 244/182; 340/961, 978, 979
See application file for complete search history.

(56) References Cited

U.S. PATENT DOCUMENTS

| | | | |
|---|---|---|---|
| 6,262,679 B1 * | 7/2001 | Tran | G01S 13/9303 342/29 |
| 6,393,358 B1 | 5/2002 | Erzberger et al. | |
| 6,587,757 B2 | 7/2003 | Sainthuile | |

(Continued)

OTHER PUBLICATIONS

Barmore, B., "Airborne Precision Spacing: A Trajectory-Based Approach to Improve Terminal Area Operations," 25th Digital Avionics Systems Conference, Oct. 15-19, 2006; retrieved from http://ntrs.nasa.gov/archive/nasa/casi.ntrs.nasa.gov/20080013631.pdf on Apr. 7, 2014, 12 pp.

(Continued)

*Primary Examiner* — Bao Long T Nguyen
(74) *Attorney, Agent, or Firm* — Shumaker & Sieffert, P.A.

(57) ABSTRACT

A method is described that includes receiving, by a spacing system of an ownship aircraft, a current position of the ownship aircraft and a reference position of a target aircraft, wherein the reference position is a position of the target aircraft prior to a current position of the target aircraft. The method may also include, projecting, by the spacing system of the ownship aircraft, the reference position on a trajectory of the ownship aircraft, determining a first distance between the projected reference position and the current position, projecting, by the spacing system of the ownship aircraft, the current position on a trajectory of the reference position, determining a second distance between the projected current position and the reference position, and adjusting, by the spacing system and based on an average between the first distance and the second distance, a velocity of the ownship aircraft.

17 Claims, 7 Drawing Sheets

(56) References Cited

U.S. PATENT DOCUMENTS

| | | | |
|---|---|---|---|
| 6,691,034 B1* | 2/2004 | Patera | G08G 5/045 340/436 |
| 6,718,236 B1 | 4/2004 | Hammer et al. | |
| 6,820,006 B2* | 11/2004 | Patera | G08G 5/045 701/301 |
| 7,583,223 B2 | 9/2009 | Brandao et al. | |
| 7,912,593 B2 | 3/2011 | Ridenour | |
| 8,060,295 B2 | 11/2011 | Estkowski et al. | |
| 8,108,087 B2 | 1/2012 | Stone et al. | |
| 2011/0288773 A1* | 11/2011 | Hoy | G05D 1/101 701/301 |
| 2013/0009792 A1* | 1/2013 | Shafaat | G08G 5/0008 340/979 |
| 2013/0261945 A1* | 10/2013 | Marcy | G08G 5/0008 701/121 |
| 2013/0325314 A1 | 12/2013 | Wang et al. | |
| 2014/0249738 A1* | 9/2014 | Euteneuer | G01S 13/9303 701/301 |

OTHER PUBLICATIONS

Galdino, A. et al., "Formal Verification of an Optimal Air Traffic Conflict Resolution and Recovery Algorithm," Abstract Only from Logic, Language, Information and Computation, Lecture Notes in Computer Science, vol. 4576, 2007, pp. 177-188; retrieved from http://link.springer.com/chapter/10.1007/978-3-540-73445-1_13# on Apr. 7, 2014, 3 pp.

Mohleji, S.C. et al., "Modeling ADS-B Position and Velocity Errors for Airborne Merging and Spacing in Interval Management Application," retrieved from http://www.mitre.org/sites/default/files/pdf/10_3026.pdf on Apr. 7, 2014, 20 pp.

Rand, T.W., "Algorithms for airborne conflict detection, prevention, and resolution," Abstract Only from The 23rd Digital Avionics Systems Conference (DASC), vol. 1, Oct. 24-28, 2004; retrieved from http://ieeexplore.ieee.org/xpl/login.jsp?tp=&arnumber=1391290&url=http%3A%2F%2Fieeexplore.ieee.org%2Fxpls%2Fabs_all.jsp%3Farnumber%3D1391290 on Apr. 7, 2014, 2 pp.

\* cited by examiner

SCALAR PRODUCT BASED SPACING CALCULATION

TECHNICAL FIELD

This disclosure relates to aircraft spacing systems.

BACKGROUND

An aircraft spacing system and other sensors onboard an ownship aircraft may be used to obtain positional information of a target aircraft to generate speed guidance to achieve and maintain a time and/or distance interval. For example, the speed guidance might be generated according to the requirements of Airborne Spacing-Flight Deck Interval Management (ASPA-FIM). ASPA-FIM may enable inter-aircraft spacing by, for example, adjusting the speed or path of the ownship aircraft. In one example, the aircraft spacing system may analyze positional information (e.g., range, altitude, direction, speed, etc.) to maintain the desired inter-aircraft spacing.

SUMMARY

In general, various examples of this disclosure are directed to techniques and systems for determining positional information of an ownship aircraft and a target aircraft and determining aircraft spacing including deviations in aircraft spacing based on the determined positional information between the ownship aircraft and the target aircraft. Various examples of this disclosure may allow for dynamic adjustment of the spacing according to the deviations in the aircraft spacing between the ownship aircraft and the target aircraft. Various examples of this disclosure may also enhance the stability of speed guidance and aircraft spacing between an ownship aircraft and a target aircraft.

In one example, the disclosure is directed to a method that includes receiving, by a spacing system of an ownship aircraft, a current position of the ownship aircraft and a reference position of a target aircraft, wherein the reference position is a position of the target aircraft prior to a current position of the target aircraft. The method may also include, projecting, by the spacing system of the ownship aircraft, the reference position on a trajectory of the ownship aircraft, determining a first distance between the projected reference position and the current position, projecting, by the spacing system of the ownship aircraft, the current position on a trajectory of the reference position, determining a second distance between the projected current position and the reference position, and adjusting, by the spacing system and based on an average between the first distance and the second distance, a velocity of the ownship aircraft.

In another example, the disclosure is directed to a method that includes receiving, by a spacing system of an ownship aircraft, a current position of the ownship aircraft and a reference position of a target aircraft, wherein the reference position is a position of the target aircraft prior to a current position of the target aircraft. The method may also include, projecting, by the spacing system of the ownship aircraft, the reference position on a trajectory of the ownship aircraft, determining a first time difference between the projected reference position and the current position, projecting, by the spacing system of the ownship aircraft, the current position on a trajectory of the reference position, determining a second time difference between the projected current position and the reference position, and adjusting, by the spacing system and based on an average between the first time difference and the second time difference, a velocity of the ownship aircraft.

In another example, the disclosure is directed to a spacing system including a spacing module located on an ownship aircraft. The spacing module is configured to receive a current position of the ownship aircraft and a reference position of a target aircraft, wherein the reference position is a position of the target aircraft prior to a current position of the target aircraft, project the reference position on a trajectory of the ownship aircraft, determine at least one of a first distance or a first time difference between the projected reference position and the current position, project the current position on a trajectory of the reference position, determine at least one of a second distance or a second time difference between the projected current position and the reference position, and adjust a velocity of the ownship aircraft based on an average between at least one of the first distance and the second distance or the first time difference and the second time difference.

The details of one or more examples are set forth in the accompanying drawings and the description below. Other features, objects, and advantages will be apparent from the description and drawings, and from the claims.

DETAILED DESCRIPTION

This disclosure describes various techniques and systems for determining deviations in aircraft spacing between an ownship aircraft and a target aircraft. In examples described herein, an ownship aircraft is configured to receive and/or store the positional information (e.g., range, altitude, direction, speed, and the like) of the ownship aircraft and the target aircraft. While the function of Airborne Spacing-Flight Deck Interval Management (ASPA-FIM) is to generate speed guidance in order to achieve and maintain a time and/or distance interval between a target aircraft and an ownship aircraft flying along the same common route (e.g., trajectory) ahead or behind the target aircraft, the two aircraft typically do not fly exactly the same trajectory. As a result, typical ASPA-FIM systems may provide inconsistent or inaccurate speed guidance, which may cause unnecessary speed fluctuations for the ownship aircraft.

This disclosure describes techniques and systems for determining positional information of an ownship aircraft and a target aircraft and determining aircraft spacing including spacing deviations based on the determined positional information of both the ownship aircraft and the target aircraft. In particular, this disclosure describes techniques and systems for determining deviations of a current spacing between an ownship aircraft and a reference position of a target aircraft from an assigned spacing between the ownship aircraft and the reference position. For example, an aircraft spacing system may dynamically adjust the current spacing between the ownship aircraft and the reference position by projecting a current position of the ownship aircraft on the trajectory of the target aircraft, projecting the reference position of the target aircraft on the trajectory of the ownship aircraft, and using the average of the distances between the current and reference positions and the projections on their respective trajectories as the spacing deviation from the assigned spacing. The average of the two distances, as calculated by the aircraft spacing system according to the techniques of this disclosure, may enable fewer adjustments to the velocity of the ownship aircraft while the ownship aircraft is following the trajectory of the target aircraft's reference position through a turn, or the like.

Techniques and systems of this disclosure may also have one or more advantages. For instance, by determining positional information and determining aircraft spacing deviations (distance and/or time) from an assigned spacing between an ownship aircraft and a target aircraft in accordance with the techniques described herein, the aircraft spacing system may provide enhanced aircraft spacing with more stable ASPA-FIM speed guidance, which may provide smoother and more accurate adjustments to speed of the ownship aircraft. In contrast to systems in which the aircraft spacing is based on only the trajectory of the ownship aircraft, the techniques and systems described herein may exhibit considerably better stability (e.g., better stability during turns and/or lateral deviations between the trajectories), and may also have an intuitive interpretation for converging and diverging trajectories of the ownship aircraft and the target aircraft. The techniques and systems described herein may also enable narrower spacing tolerances by providing more precise, stable, and reliable deviation determinations and speed guidance relative to conventional techniques.

Figure 1:
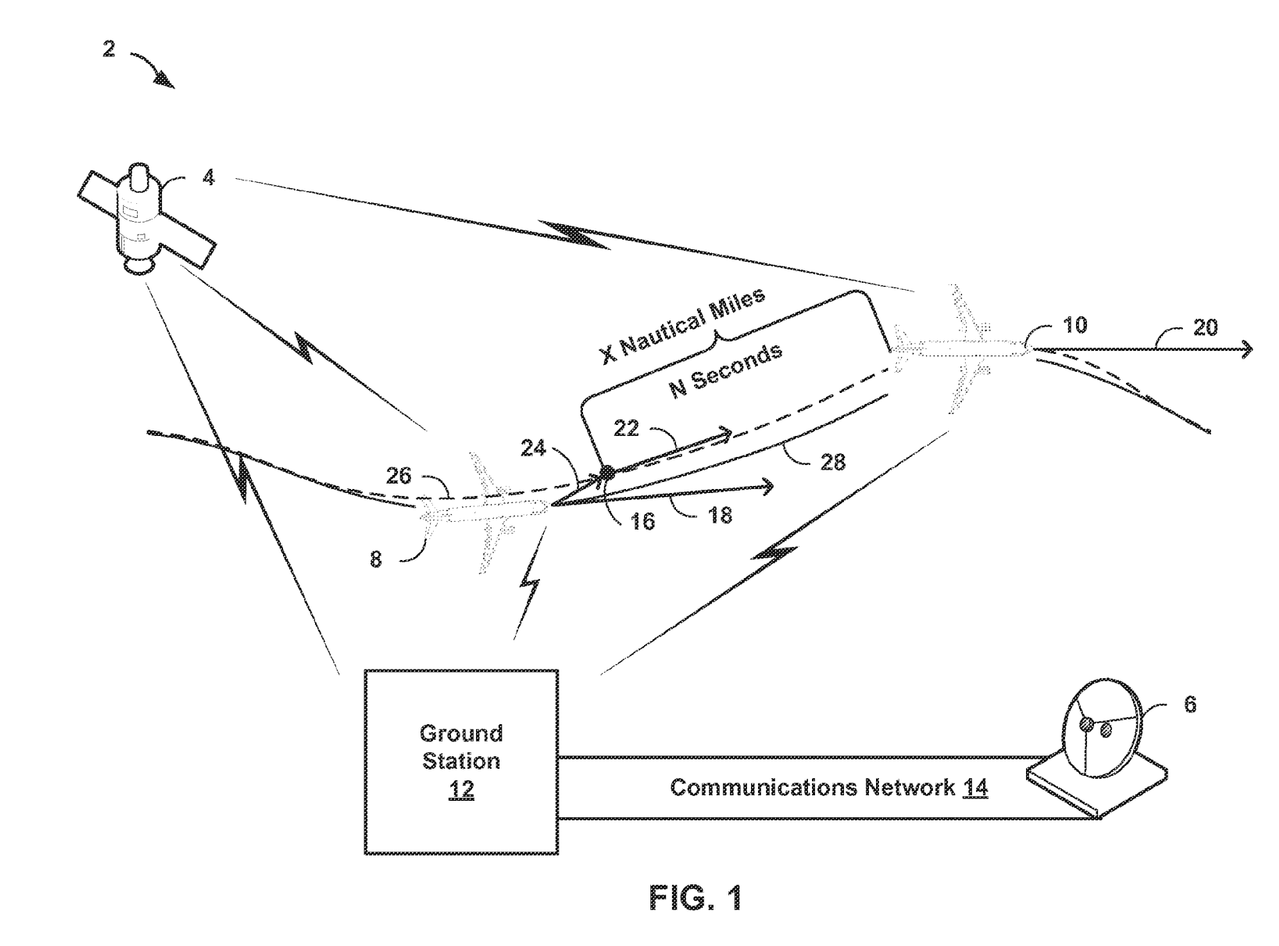
FIG. 1 is a conceptual diagram illustrating an example aircraft spacing system.

FIG. 1 is a conceptual diagram of an example aircraft spacing system 2. In the example of FIG. 1, system 2 includes satellite 4, ground-based radar instrumentation 6, ownship aircraft 8, target aircraft 10, ground station 12, communications network 14, reference position 16, velocity vectors 18-22, position vector 24, and trajectories 26 and 28.

Satellite 4 is configured to receive positional information from aircraft, such as ownship aircraft 8 and target aircraft 10. Ground-based radar instrumentation 6 is configured to generate positional information indicative of an aircraft, such as ownship aircraft 8 and target aircraft 10 within a sensor range of instrumentation 6. Ownship aircraft 8 and target aircraft 10 may be configured to generate positional information indicative of one or more aircraft, such as ownship aircraft 8 and target aircraft 10. The positional information generated by ownship aircraft 8 and target aircraft 10 can include, for example, information from one or more of: onboard radar systems, other onboard detection and ranging systems, navigation systems, and the like. The type of positional information available to ownship aircraft 8, can, therefore, include, depending upon sensor availability, range, altitude, direction, speed, trajectory and the like of ownship aircraft 8, target aircraft 10, and reference position 16 which is a position on the trajectory of target aircraft 10, N seconds or X nautical miles prior to the current position of target aircraft 10, where N and/or X represent a number greater than zero.

A position, velocity vector (direction and ground-based speed), and trajectory (path through space as a function of time) may be associated with ownship aircraft 8 and target aircraft 10, respectively. Reference position 16 may also have a position, velocity vector, and trajectory based on the position, velocity vector, and trajectory of target aircraft, N seconds or X nautical miles prior to the current position of target aircraft 10. For example, velocity vector 18 and trajectory 28 is associated with ownship aircraft 8, velocity vector 20 and trajectory 26 is associated with target aircraft 10, and velocity vector 22 and trajectory 26 is associated with reference position 16. Velocity vectors 18-22 (e.g., direction and speed of ownship aircraft 8, target aircraft 10, and reference position 16) and trajectories 26 and 28 may be included in the positional information available to ownship aircraft 8. In some examples, positions of ownship aircraft 8, target aircraft 10, and reference 16 may be included in the positional information available to ownship aircraft 8.

Trajectories 26 and 28 may be based on the locations of ownship aircraft 8 and target aircraft 10 over time. For example, a portion of trajectories 26 and 28 may be based on the past locations of ownship aircraft 8 and target aircraft 10, a portion of trajectories 26 and 28 may be based on the future locations of ownship aircraft 8 and target aircraft 10. In some examples, an aircraft spacing system may calculate a portion of trajectories 26 and 28 based on velocity vectors 18 and 20 associated with ownship aircraft 8 and target aircraft 10, respectively. In one example, trajectory 26 associated with reference position 16 may be entirely composed of past locations of target aircraft 10 over time. In another example, trajectory 28 associated with ownship aircraft 8 may be partially composed of past locations and partially composed of future locations over time, and the future locations may be determined by an aircraft spacing system using velocity vector 18 associated with ownship aircraft 8. Additionally, the aircraft spacing system may also use position vector 24, and any deviations of position vector 24 along with velocity vector 18 to determine trajectory 28 of ownship aircraft 8. In some examples, position vector 24 may be calculated by the aircraft spacing system.

Ground station 12 may be configured to receive the positional information from one of the sources 4, 6, 8, 10, via downlink and/or via communications network 14. Communications network 14 may comprise any one or more of a fiber optic network, telephone system, internet, radio or cell phone link or any other suitable communications network. In some examples, ground station 12 may be configured to collect positional information from a plurality of sources, which, in the example shown in FIG. 1, include satellite 4, ground-based radar instrumentation 6, ownship aircraft 8 and target aircraft 10. In some examples, ground station 12 may be configured to collect positional information from a subset of the sources shown in FIG. 1.

Ownship aircraft 8 may determine positional information of ownship aircraft 8 and a target aircraft (e.g., target aircraft 10). For example, ownship aircraft 8 may use onboard systems (radar, global positioning system (GPS), TCAS, or the like), satellite 4, and/or ground station 12 to determine positional information of a target aircraft. As described in further detail below, after determining the positional information of ownship aircraft 8 and target aircraft 10, ownship aircraft 8 may generate aircraft spacing information, such as ASPA-FIM speed guidance, between ownship aircraft 8 and target aircraft 10 based on the determined positional information. For example, ownship aircraft 8 may use the determined positional information to determine aircraft spacing deviations, allowing for adjustments of the ASPA-FIM speed guidance. In some examples, the aircraft spacing according to ASPA-FIM may be the current position of ownship aircraft 8 and reference position 16 where target aircraft 10 was N seconds or X nautical miles prior to the current position of target aircraft 10. In some examples, position vector 24 may be the difference between the current position of ownship aircraft 8 and reference position 16. In some examples, position vector 24 may be determined by the aircraft spacing system to be a distance and/or time.

In some examples, ownship aircraft 8 may transmit a request to ground station 12 for positional information of one or more aircraft and/or reference points (e.g., positional information of ownship aircraft 8, target aircraft 10, and reference position 16). As described in further detail below, ground station 12 may receive the request for positional information from ownship aircraft 8, and may request positional information from one or more aircraft (e.g., target aircraft 10) in response to determining that the one or more aircraft can provide positional information regarding a reference point (e.g., reference position 16). Ground station 12 may be in a better position than ownship aircraft 8 to determine which aircraft can provide positional information regarding a reference point. In response to receiving the request for positional information, the one or more selected aircraft (e.g., target aircraft 10) may transmit the positional information to ground station 12. Ground station 12 may uplink the received positional information to ownship aircraft 8.

In some examples, ground station 12 processes the received positional information received from the one or more entities 4, 6, 10, 12 prior to uplinking the positional information to ownship aircraft 8. For example, ground station 12 may combine the positional information from multiple aircraft or may combine the positional information from other sources 4, 6, or both or combine the positional information with other data, or any combination thereof.

Ownship aircraft 8 may include a system configured to receive the uplinked positional information of ownship aircraft 8 and target aircraft 10 from ground station 12, and may then generate aircraft spacing, such as ASPA-FIM speed guidance, between ownship aircraft 8 and target aircraft 10 based on the received positional information. For example, ownship aircraft 8 may use the received positional information to determine aircraft spacing deviations, allowing for adjustments of the ASPA-FIM speed guidance. In some examples, the aircraft spacing according to ASPA-FIM may be the current position of ownship aircraft 8 and reference position 16 where target aircraft 10 was N seconds or X nautical miles prior to the current position of target aircraft 10. In some examples, position vector 24 may be the difference between the current position of ownship aircraft 8 and reference position 16. In some examples, deviations in position vector 24 may be determined by the aircraft spacing system to be a distance and/or time.

Ownship aircraft 8 and/or ground station 12 may also include a spacing system with a spacing module. In one example, the spacing module may determine aircraft spacing by receiving a current position of ownship aircraft 8 and reference position 16 of target aircraft 10, where reference position 16 is a position on a past trajectory of target aircraft 10, N seconds or X nautical miles prior to a current position of target aircraft 10. Responsive to receiving the positional information of ownship aircraft 8 and target aircraft 10, the spacing module may project reference position 16 on a trajectory (e.g., a future trajectory based on velocity vector 18) of the ownship aircraft 8 and may project the position of ownship aircraft 8 on the trajectory of target aircraft 10 prior to reference point 16. Responsive to projecting the current position of ownship aircraft 8 and reference position 16 onto their respective trajectories, the spacing module may determine at least one of a first distance or a first time difference between the projected reference position and the current position. In addition, the spacing module may also determine at least one of a second distance or a second time difference between the projected current position and the reference position. Responsive to the determination of either the first and second distances and/or the first and second time differences, the spacing module or the aircraft spacing system may adjust a velocity of ownship aircraft 8 based on an average between at least one of the first distance and the second distance or the first time difference and the second time difference.

In some examples, the spacing module of ownship aircraft 8 may be a processor. In one example, the spacing module may determine the first distance by subtracting the current position of ownship aircraft 8 from reference position 8, applying a dot product of velocity vector 22, and dividing by a magnitude of velocity vector 22. In another example, the spacing module may determine the second distance by subtracting the current position of ownship aircraft 8 from reference position 16, applying a dot product of velocity vector 18, and dividing by a magnitude of velocity vector 18. Additionally, the spacing module may determine the first distance by determining an angle alpha, which is an angle between position vector 24 and the trajectory of velocity vector 18, and applying a cosine of the angle alpha. In another example, the spacing module may also determine the second distance by determining an angle alpha minus gamma, which is an angle of position vector 24 and velocity vector 18 minus the angle between the trajectory of velocity vector 22 and the trajectory of the velocity vector 18, and applying a cosine of the angle alpha minus gamma.

In some examples, the spacing module may determine the first time difference by subtracting the current position of ownship aircraft 8 from reference position 16, applying a dot product of velocity vector 22, and dividing by a squared magnitude of velocity vector 22. Additionally, the spacing module may also determine the second time difference by subtracting the current position of ownship aircraft 8 from reference position 16, applying a dot product of velocity vector 18, and dividing by a squared magnitude of velocity vector 18. In some examples, the assigned time difference is N seconds or X nautical miles prior to the current position of target aircraft 10.

Figure 2:
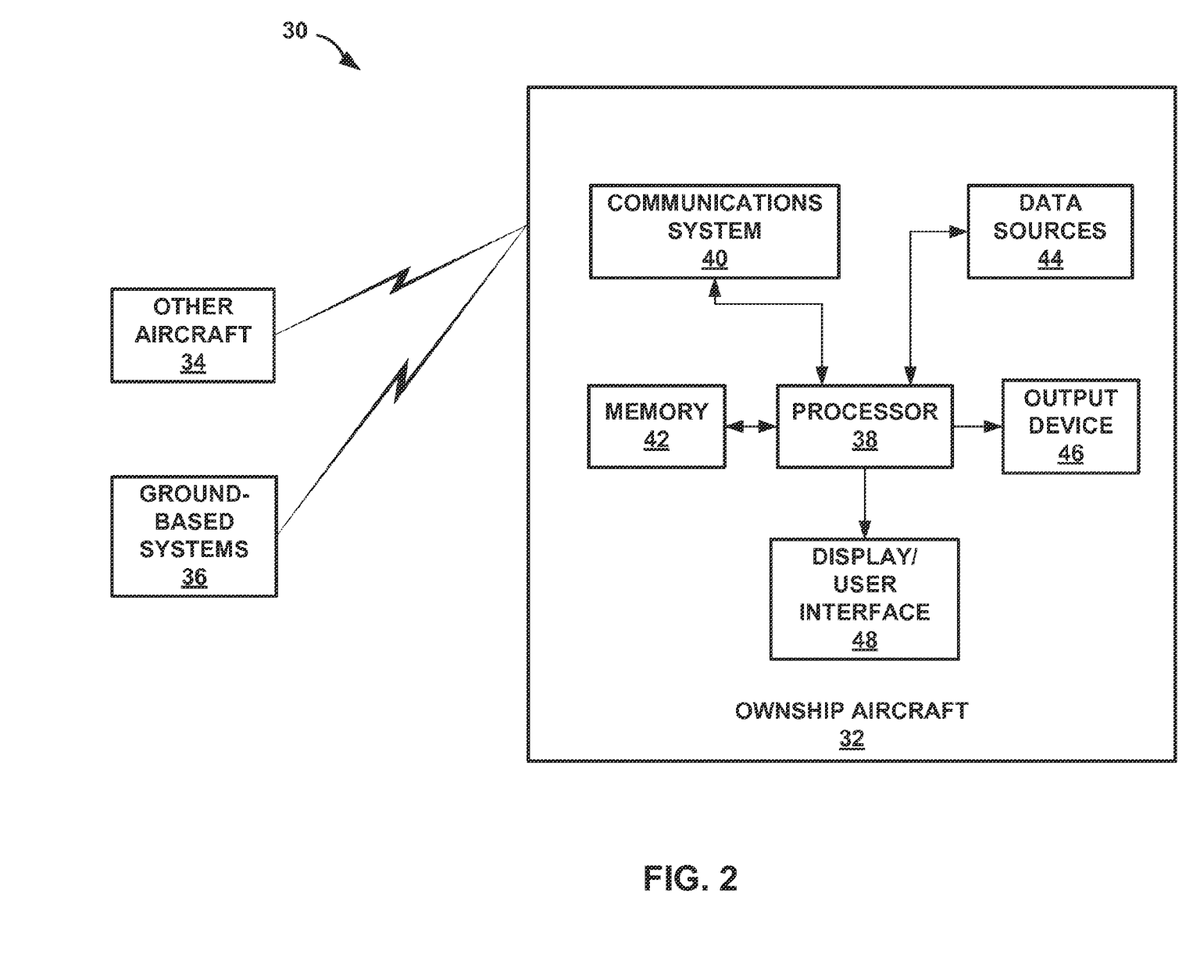
FIG. 2 is a block diagram illustrating an example aircraft spacing system.

FIG. 2 is a block diagram illustrating an example aircraft spacing system 30 (referred to herein as "system 30"), which is configured to receive positional information of ownship aircraft 32 and a target aircraft from one or more sources and determine aircraft spacing between ownship aircraft 32 and the target aircraft using the received positional information. System 30 may be an example of system 2 shown in FIG. 1.

In the example shown in FIG. 2, system 30 includes an ownship aircraft 32, one or more other aircraft 34, and one or more ground-based systems 36. For simplicity and not to be meant as limiting, FIG. 2 is discussed herein as having a single ownship aircraft 32, a single aircraft 34, and a single ground-based system 36. However, in other examples, system 30 can include other numbers of aircraft 34 and ground-based systems 36. Positional information can be collected by ownship aircraft 32, one or more other aircraft 34, and ground-based system 36. Each of ownship aircraft 32 and other aircraft 34 may be a piloted aerial vehicle (e.g., a commercial airliner), helicopter, an autonomous aerial vehicle, a satellite, or other type of vehicle.

Ownship aircraft 32 includes a processor 38, a display or user interface 48, one or more communications system 40, a memory 42, one or more data sources 44 (e.g., global positioning system (GPS), radar systems, TCAS, and the like), and one or more output devices 46. As shown in FIG. 2, these components are located on ownship aircraft 32. However, in some examples, some of these components are not located onboard ownship aircraft 32. For example, one or more of processor 38, display/user interface 48, communications system 40, memory 42, and data sources 44 may be located external to ownship aircraft 32. Some of these components may be located external to ownship aircraft 32, such as in an air traffic control center or another ground control center, such as ground-based system 36. For example, a processor may be located external to ownship aircraft 32 and may perform any part of the functions attributed to processor 38 herein. For example, the processor located external to ownship aircraft 32 may be configured to determine aircraft spacing based on data received from data sources 44 onboard ownship aircraft 32, as well as data sources (e.g., other aircraft 34 or ground-based systems 36, or both) external to ownship aircraft 32.

Ground-based system 36, which can be, for example, a ground station, includes a memory (which stores positional information of ownship aircraft 32 and other aircraft 34, such as a target aircraft), a processor, and a communications system. Although not shown in FIG. 2, other aircraft 34 may be configured similarly to ownship aircraft 32.

Processors 38 as well as other processors disclosed herein, can each comprise any suitable arrangement of hardware, software, firmware, or any combination thereof, to perform the techniques attributed to the respective processor 38 herein. For example, processors 38 may each include any one or more microprocessors, digital signal processors (DSPs), application specific integrated circuits (ASICs), field programmable gate arrays (FPGAs), or any other equivalent integrated or discrete logic circuitry, as well as any combinations of such components. Memories 42 can each include any volatile or non-volatile media, such as a RAM, ROM, non-volatile RAM (NVRAM), electrically erasable programmable ROM (EEPROM), flash memory, and the like. Memories 42 may store computer readable instructions that, when executed by the respective processor 38, cause the processor to the techniques attributed to the processor herein.

Display/user interface 48 is configured to deliver aircraft spacing information (generated based on positional information) to a user, who may be a part of a crew in a flight deck of ownship aircraft 32 or may be located remotely from ownship aircraft 32. Display/user interface 48 may comprise one or more of headphones, a speaker, a visual display, or a tactile device. For example, display/user interface 48 can include one or more of a display screen (e.g., a liquid crystal display (LCD) or a light emitting diode (LED) display) configured to present information to the user, a speaker configured to deliver an audible aircraft spacing update, or the like. The display can include, for example, an electronic flight bag (EFB), a primary flight display (PFD), a multifunction display (MFD), a navigation display, or any other suitable display. In some examples, the display may be a touch screen display. In addition, display/user interface 48 can include one or more of a keypad, buttons, a peripheral pointing device or another input mechanism that allows the user to provide input.

Processor 38 is configured to send and receive information over a data channel via communications system 40, which may include a transceiver (e.g., a receiver and/or a transmitter). For example, processor 38 may be configured to send, receive, or both send and receive data from data sources external to ownship aircraft 32, such as from other aircraft 34 and ground-based system 36. The data received by processor 38 can include, for example, positional information indicative of the current position of ownship 32 and the current and previous positions of other aircraft 34, such as a target aircraft. Examples of data that can be received from sources external to ownship aircraft 32 include, but are not limited to, data indicating the location and, in some cases, the velocity (e.g., speed and direction), of other aircraft in the air from other sources (e.g., one or more other aircraft 34 or ground-based systems 36).

Communication system 40 may be configured to communicate with ground-based system 36, other aircraft 34, or both, by way of any suitable datalink, such as, but not limited to, a very high frequency (VHF) spectrum datalink (e.g., about 30 megahertz to about 300 megahertz), a datalink provided by a satellite, a cellular datalink, or other air/ground or air/air datalinks. Ground-based system 36 may have a communication system similar to communication system 40.

Processor 38 is also configured to receive data from, and, in some cases, control, one or more data sources 44 onboard ownship aircraft 32. The communicative coupling between processor 38 and one more data sources 44 may be, for example, a data bus. The input from one or more data sources 44 may also be stored in memory 42 in some examples. Different input may be stored in memory 42 so as to define different types of positional information or different types of input, and processor 38 may be configured to interpret data in memory 42 as being indicative of different positional information. In addition to, or instead of memory 42 onboard ownship aircraft 32, positional information can be stored by a device external to ownship aircraft 32 and accessible to processor 38 via, e.g., a communication system 40, which can be any suitable datalink.

One or more data sources 44 are configured to generate data from which processor 38 may determine aircraft spacing between ownship aircraft 32 and other aircraft 34, such as a target aircraft. Thus, processor 38 may determine aircraft spacing for ownship aircraft 32 based on data from one or more data sources 44. For example, one or more data sources 44 may be configured to generate positional information indicative of a target aircraft near ownship aircraft 32 or within a detectable range of the one or more data sources 44. The positional information may include, but is not limited to, one or more of data indicative of location, altitude, range, speed, or the like.

One or more data sources 44 may also include sources that determine positional information of ownship aircraft 32, including one or more of a GPS, an inertial navigation system (INS), or another positioning system configured to indicate the location of ownship aircraft 32. The location of ownship aircraft 32 indicated by the data from one or more data sources 44 may be the geographic location (e.g., latitude and longitude) of ownship aircraft 32, the location of ownship aircraft 32 relative to one or more landmarks, or any combination thereof. Processor 38 can use the location of ownship aircraft 32 to geo-reference positional information generated by one or more data sources 44. For example, processor 38 can annotate the positional information (e.g., latitude, longitude, and altitude) for which the positional information indicates a location and a timestamp that indicates the time for which the positional information was generated. Geo-referenced positional information may be useful for, for example, aggregating positional information from a plurality of different sources. Processor 38 can be configured to implement any suitable data processing technique to interpret positional information and geo-reference positional information.

One or more data sources 44 may include any devices and components necessary to perform remote sensing, such as one or more antennas. Processor 38 is configured to remotely sense distances to other aircraft 34 (e.g., a target aircraft) by at least controlling a radar system to generate and transmit waves (such as electromagnetic waves, for example, radio waves) and analyzing the resulting backscatter radiation. For example, processor 38 can be configured to determine the location of an ownship 32 or other aircraft 34 (e.g., a target aircraft) based on radar return pulses. In some examples, the radar system may be configured to scan one or more volumes of three dimensional space for other aircraft 34 (e.g., a target aircraft) and provide data related to the distance and bearing of other aircraft 34 to processor 38.

Processor 38 is configured to receive positional information from data sources 44. Processor 38 may also receive positional information from one or more entities other than ownship aircraft 32, such as from other aircraft 34 and one or more ground-based system 36, via communications system 40. If positional information is received from multiple sources, processor 38 may aggregate the positional information into a combined set of positional information. In addition, processor 38 may determine aircraft spacing based on the received positional information, and control display/user interface 48 to generate a graphical user interface that presents information regarding the determined aircraft spacing.

Display/user interface 48 may also be configured to receive a request for positional information for a target aircraft. For example, a user may provide input to display/user interface 48 that requests positional information of a target aircraft (e.g., along a common path of ownship aircraft 32). The request may also include a specific time range, altitude levels, and the like. Processor 38 may receive the request input into display/user interface 48 and transmit the request to another entity, such as ground-based system 36, one or more other aircraft 34, or both. In response to receiving the request, the entity may transmit the requested positional information to ownship aircraft 32. Processor 38 may receive the requested positional information and generate speed guidance using the requested positional information to present to the user. In some examples, processor 38 may also use the generated speed guidance to adjust the velocity of the ownship aircraft 32.

Processor 38 may also be configured to automatically request positional information from one or more entities in the absence of user input. For example, processor 38 may determine that additional positional information from sources besides ownship aircraft 32 may be desirable. As an example, processor 38 may determine that the onboard data sources 44 are unable to provide sufficient positional information for a target aircraft along the common flight path of ownship aircraft 32, the flight path being determined, e.g., based on a flight management system of ownship aircraft 32. In response to determining a target aircraft of interest where additional positional information may be desirable, processor 38 may generate a request for positional information for the target aircraft. Processor 38 may control communication system 40 to downlink the request to another entity, such as other aircraft 34 or a ground-based system 36. Processor 38 may determine when to transmit the request based on some considerations (e.g., how much bandwidth is available at a given time, a cost of the data transfer, and the like).

In some examples, a processor of ground-based system 36 is configured to transmit, via a communications system, requests for positional information to one or more entities, such as ownship aircraft 32 or other aircraft 34, as described above with respect to ground station 14 as described in FIG. 1, and receive the requested positional information from the one or more entities. A processor of ground-based system 36 may store received positional information for one or more geographical regions over a period of time in a positional information base.

Processor 38 is configured to determine a deviation in the aircraft spacing between ownship aircraft 32 and other aircraft 34 (e.g., a target aircraft like aircraft 10 as described in FIG. 1) using the position information received from one or more data sources, one or more other aircraft 34, and/or one or more ground-based systems 36. For example, processor 38 may be configured to determine aircraft spacing according to Airborne Spacing-Flight Deck Interval Management (ASPA-FIM). To determine the aircraft spacing according to ASPA-FIM, processor 38 may use a reference position (e.g., reference position 16 as described in FIG. 1) of a target aircraft, where the reference position is where the target aircraft was located, N seconds or X nautical miles prior to the target aircraft's current position. In some examples, N is the assigned spacing according to the ASPA-FIM system.

To determine the deviation between the target aircraft's reference position and the current position of ownship aircraft 32, processor 38 may calculate the scalar product of reference position in relation to the trajectory (e.g., velocity vector) of ownship aircraft 32 and the scalar product of current position of ownship aircraft 32 in relation to the trajectory (e.g., velocity vector) of the reference position. In other words, processor 38 may project the current position of ownship aircraft 32 and the target's aircraft reference position onto the other's respective trajectory to determine either two distance values or two time values. The two distance or time values may correspond to the difference between the projected current position of ownship 32 and the target aircraft's reference position and the projected reference position of the target aircraft the current position of ownship 32. Processor 38 may use an average of the two distance values and/or two time values, as the aircraft spacing deviation of the current position of ownship aircraft 32 from the target aircraft's reference position. In other words, the average of the distance or time values provides a distance or time spacing deviation, and the distance or time spacing deviation works well with ownship aircraft 32 in relation to the target aircraft, even during turns.

Figure 3:
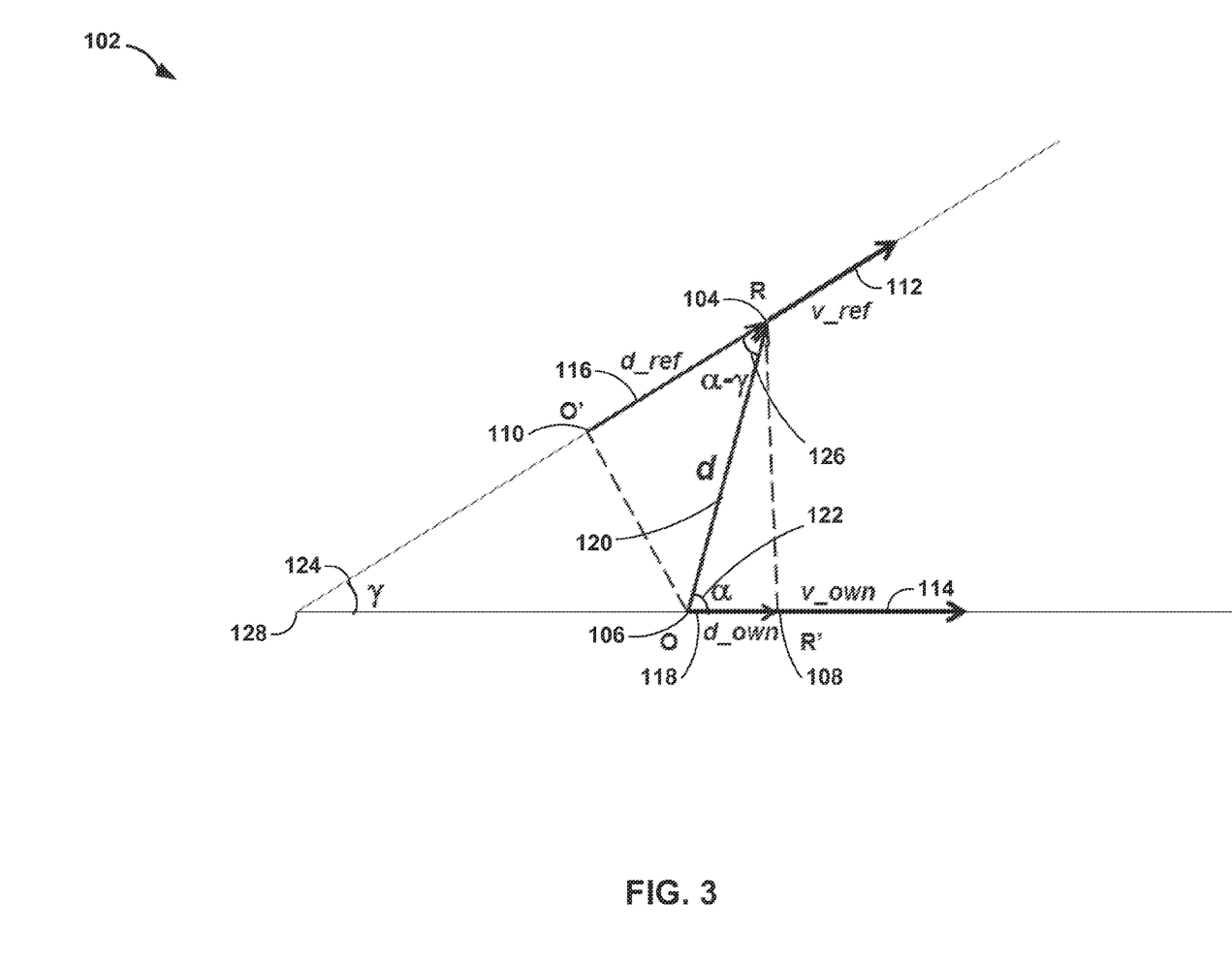
FIGS. 3-4 are conceptual diagrams illustrating example average distance spacing deviations between a current position of an ownship aircraft and a reference point in an aircraft spacing system.
Figure 4:
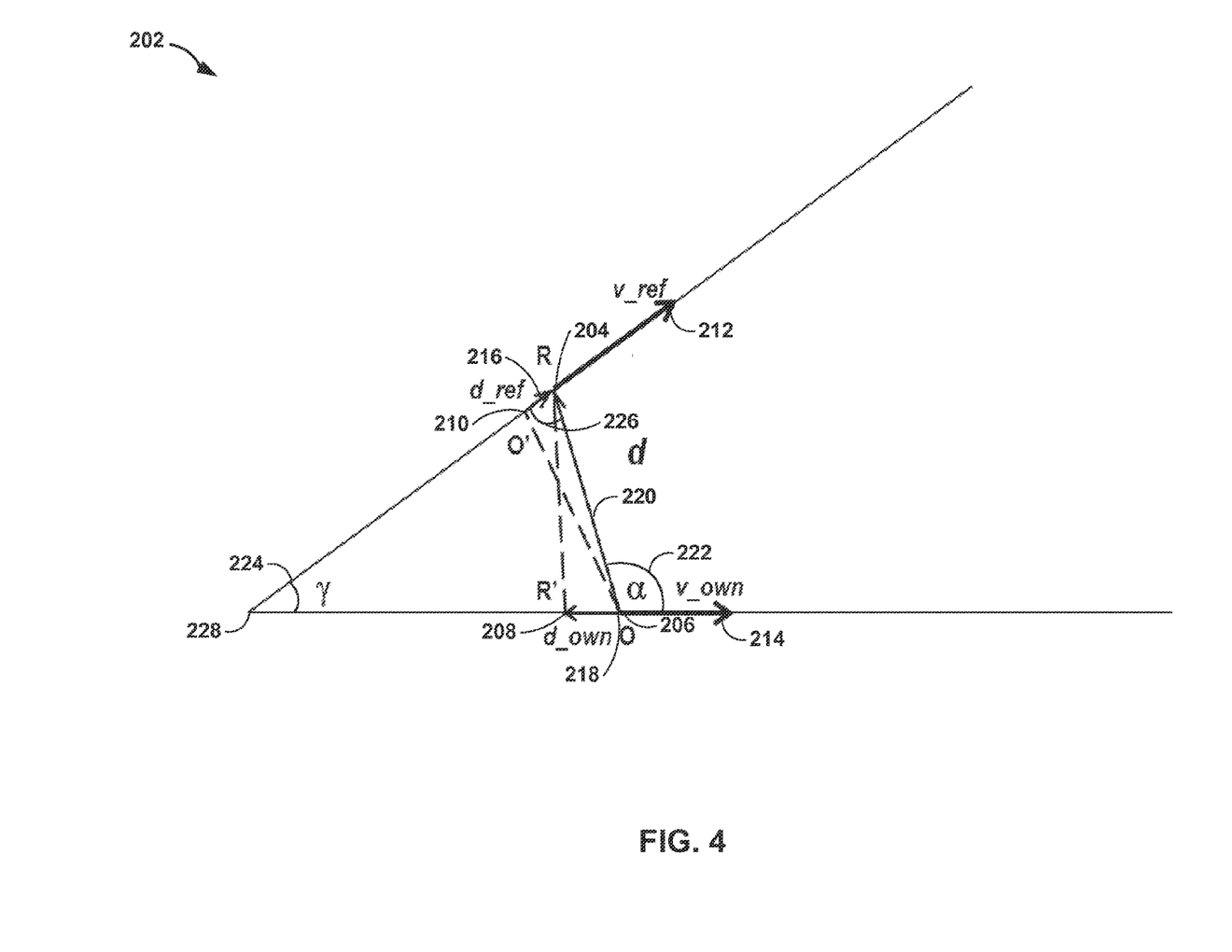

FIGS. 3-4 are conceptual diagrams illustrating example average distance spacing deviations between a current position of an ownship aircraft and a reference point in aircraft spacing system 102 and 202. FIGS. 3-4 are described within the context of FIG. 2.

In the example of FIG. 3, aircraft spacing system 102 includes target aircraft's reference position 104 (which corresponds to "R" in FIG. 3), ownship aircraft's current position 106 (which corresponds to "O" in FIG. 3), reference projection 108 (which corresponds to R' in FIG. 3), ownship projection 110 (which corresponds to O' in FIG. 3), reference velocity vector 112 (which corresponds to "v_ref" in FIG. 3), ownship velocity vector 114 (which corresponds to "v_own" in FIG. 3), reference distance 116 (which corresponds to "d_ref" in FIG. 3), ownship distance 118 (which corresponds to "d_own" in FIG. 3), position vector 120 (which corresponds to "d" in FIG. 3), angle alpha 122 (which corresponds to "α" in FIG. 3), angle gamma 124 (which corresponds to "γ" in FIG. 3), angle alpha minus gamma 126 (which corresponds to "α−γ" in FIG. 3), and origin 128.

In the example of FIG. 3, target aircraft's reference position 104 may be the reference position on a past trajectory of the target aircraft (e.g., N seconds earlier or X nautical miles before the target aircraft's current position, where N and/or X represent a number greater than zero). Ownship aircraft's current position 106 may be the current position of the ownship aircraft. Reference projection 108 may be the point projected onto the trajectory (e.g., a trajectory based on ownship velocity vector 114) of ownship aircraft's current position 106. Ownship projection 110 may be the point projected onto the prior trajectory of target aircraft's reference position 104. Reference velocity vector 112 may be the velocity vector associated with the target aircraft at target aircraft's reference position 104. Ownship velocity vector 114 may be the velocity vector associated with the ownship aircraft at ownship aircraft's current position 106. Reference distance 116 may be the distance between ownship projection 110 and target aircraft's reference position 104. Ownship distance 118 may be the distance between ownship aircraft's current position 106 and reference projection 108. Position vector 120 may be the distance between ownship aircraft's current position 106 and target aircraft's reference position 104. Angle alpha 122 may be the angle between position vector 120 and ownship velocity vector 114. Angle gamma 124 may be the angle between reference velocity vector 112 and ownship velocity vector 114. Angle alpha minus gamma 126 may be the angle between position vector 120 and the trajectory of target aircraft's reference position 104. Origin 128 may be an origin of coordinates for position vectors in aircraft spacing system 102. In some examples, origin 128 may be an arbitrary reference point.

In the example of FIG. 3, processor 38 may receive positional information including reference position 104 with an associated trajectory, ownship aircraft's current position 106, reference velocity vector 112, and ownship velocity vector 114 from other aircraft 34 and/or ground-based systems 36 via communication system 40, from memory 42, and/or from data sources 44. Responsive to receiving the positional information, processor 38 may project ownship aircraft's current position 106 onto the trajectory associated with reference position 104 to determine ownship projection 110. Additionally, processor 38 may also project target aircraft's reference position 104 onto the trajectory of ownship position 106 (e.g., the trajectory may be based on ownship velocity vector 114) to determine reference projection 108. In other words, processor 38 may use the positional information to project ownship aircraft's current position 106 onto the trajectory of reference position 104 to determine ownship projection 110, and project target aircraft's reference position 104 onto the trajectory of ownship position 106 to determine reference projection 108. In some examples, position vector 120 may also be calculated by processor 38.

For example, to determine ownship projection 110 and reference projection 108, processor 38 may determine reference distance 116, which is the distance between target aircraft's reference position 104 and ownship projection 110, and ownship distance 118, which is the distance between ownship aircraft's current position 106 and reference projection 108. In some examples, processor 38 may determine reference distance 116 using equation (1) and ownship distance 118 using equation (2), where $r_{ref}$ is target aircraft's reference position vector corresponding to reference position 104 and the $r_{own}$ is ownship aircraft's current position vector corresponding to current position 106. For instance, $r_{ref}$ and $r_{own}$ are the position vectors which share any common origin of coordinates (e.g., origin 128). In some examples, processor 38 may determine reference distance 116 using equation (3) and ownship distance 118 using equation (4), where d is position vector 120, angle alpha 122 is the angle between position vector 120 and ownship velocity vector 114, and angle gamma 124 is the angle between reference velocity vector 112 and ownship velocity vector 114. In addition, the angle alpha minus gamma 126 is the difference between angle alpha 122 and angle gamma 124.

$$d_{ref} = \frac{(\vec{r}_{ref} - \vec{r}_{own}) \cdot \vec{v}_{ref}}{|\vec{v}_{ref}|} \quad (1)$$

$$d_{own} = \frac{(\vec{r}_{ref} - \vec{r}_{own}) \cdot \vec{v}_{own}}{|\vec{v}_{own}|} \quad (2)$$

$$d_{ref} = d \cdot \cos\alpha \quad (3)$$

$$d_{own} = d \cdot \cos(\alpha - \gamma) \quad (4)$$

In some examples, processor 38 may determine the deviation in distance spacing between ownship aircraft's current position 106 and target aircraft's reference position 104 by averaging reference distance 116 and ownship distance 118. In the example of FIG. 3, the perspective of ownship aircraft 32 at ownship aircraft's current position 106 is reference projection 108 is in front of ownship aircraft's current position 106. In the example of FIG. 3, the perspective of the target aircraft at target aircraft's reference position 106 is ownship projection 110 is behind target aircraft's reference position 106. In the example of FIG. 3, processor 38 may calculate the deviation in the distance spacing to be a positive value because ownship aircraft's current position 106 is behind target aircraft's reference position 106 by the average of reference distance 116 and ownship distance 118.

In the example of FIG. 4, aircraft spacing system 202 include target aircraft's reference position 204 (which corresponds to "R" in FIG. 4), ownship aircraft's current position 206 (which corresponds to "O" in FIG. 4), reference projection 208 (which corresponds to R' in FIG. 4), ownship projection 210 (which corresponds to O' in FIG. 4), reference velocity vector 212 (which corresponds to "v_ref" in FIG. 4), ownship velocity vector 214 (which corresponds to "v_own" in FIG. 4), reference distance 216 (which corresponds to "d_ref" in FIG. 4), ownship distance 218 (which corresponds to "d_own" in FIG. 4), position vector 220 (which corresponds to "d" in FIG. 4), angle alpha 222 (which corresponds to "α" in FIG. 4), angle gamma 224 (which corresponds to "γ" in FIG. 4), angle alpha minus gamma 226 (which corresponds to "α-γ" in FIG. 4), and origin 228.

In the example of FIG. 4, target aircraft's reference position 204 may be the reference position on a past trajectory of the target aircraft (e.g., N seconds earlier or X nautical miles before the target aircraft's current position). Ownship aircraft's current position 206 may be the current position of the ownship aircraft. Reference projection 208 may be the point projected onto the trajectory (e.g., a trajectory based on ownship velocity vector 214) of ownship aircraft's current position 206. Ownship projection 210 may be the point projected onto the prior trajectory of target aircraft's reference position 204. Reference velocity vector 212 may be the velocity vector associated with the target aircraft at target aircraft's reference position 204. Ownship velocity vector 214 may be the velocity vector associated with the ownship aircraft at ownship aircraft's current position 206. Reference distance 216 may be the distance between ownship projection 210 and target aircraft's reference position 204. Ownship distance 218 may be the distance between ownship aircraft's current position 206 and reference projection 208. Position vector 220 may be the distance between ownship aircraft's current position 206 and target aircraft's reference position 204. Angle alpha 222 may be the angle between position vector 220 and ownship velocity vector 214. Angle gamma 224 may be the angle between reference velocity vector 212 and ownship velocity vector 214. Angle alpha minus gamma 226 may be the angle between position vector 220 and the trajectory of target aircraft's reference position 204. Origin 228 may be an origin of coordinates for position vectors in aircraft spacing system 202. In some examples, origin 228 may be an arbitrary reference point.

In the example of FIG. 4, processor 38 may receive positional information including target aircraft's reference position 204 with an associated trajectory, ownship aircraft's current position 206, reference velocity vector 212, and ownship velocity vector 214 from other aircraft 34 and/or ground-based systems 36 via communication system 40, from memory 42, and/or from data sources 44. Responsive to receiving the positional information, processor 38 may project ownship aircraft's current position 206 onto the trajectory associated with reference position 204 to determine ownship projection 210. In addition, processor 38 may project target aircraft's reference position 204 onto the trajectory of ownship position 206 (e.g., the trajectory may be based on ownship velocity vector 214) to determine reference projection 208. In other words, processor 38 may use the positional information to project ownship aircraft's current position 206 onto the trajectory of reference position 204 to determine ownship projection 210, and project target aircraft's reference position 204 onto the trajectory of ownship position 206 to determine reference projection 208. In some examples, position vector 220 may also be calculated by processor 38.

For example, to determine ownship projection 210 and reference projection 208, processor 38 may determine reference distance 216, which is the distance between ownship projection 210 and target aircraft's reference position 204, and ownship distance 218, which is the distance between reference projection 208 and ownship aircraft's current position 206. In some examples, processor 38 may determine reference distance 216 using equation (1) and ownship distance 218 using equation (2) as described in FIG. 3, where $r_{ref}$ is target aircraft's reference position vector corresponding to reference position 204 and the $r_{own}$ is ownship aircraft's current position vector corresponding to current position 206. For instance, $r_{ref}$ and $r_{own}$ are the position vectors which share any common origin of coordinates (e.g., origin 228). In some examples, processor 38 may determine reference distance 216 using equation (3) and ownship distance 218 using equation (4) as described in FIG. 3, where d is position vector 220, angle alpha 222 is the angle between position vector 220 and ownship velocity vector 214, and angle gamma 224 is the angle between reference velocity vector 212 and ownship velocity vector 214. Angle alpha minus gamma 226 is the difference between angle alpha 222 and angle gamma 224.

In some examples, processor 38 may determine the deviation in distance spacing between ownship aircraft's current position 206 and target aircraft's reference position 204 by averaging reference distance 216 and ownship distance 218. In the example of FIG. 4, the perspective of ownship aircraft 32 at ownship aircraft's current position 206 is reference projection 208 is behind ownship aircraft's current position 206. In the example of FIG. 4, the perspective of the target aircraft at target aircraft's reference position 106 is ownship projection 210 is behind target aircraft's reference position 204. In the example of FIG. 4, processor 38 may calculate the deviation in the distance spacing to be a negative value because target aircraft's reference position 204 is behind ownship aircraft's current position 206 by the average of reference distance 216 and ownship distance 218.

Figure 5:
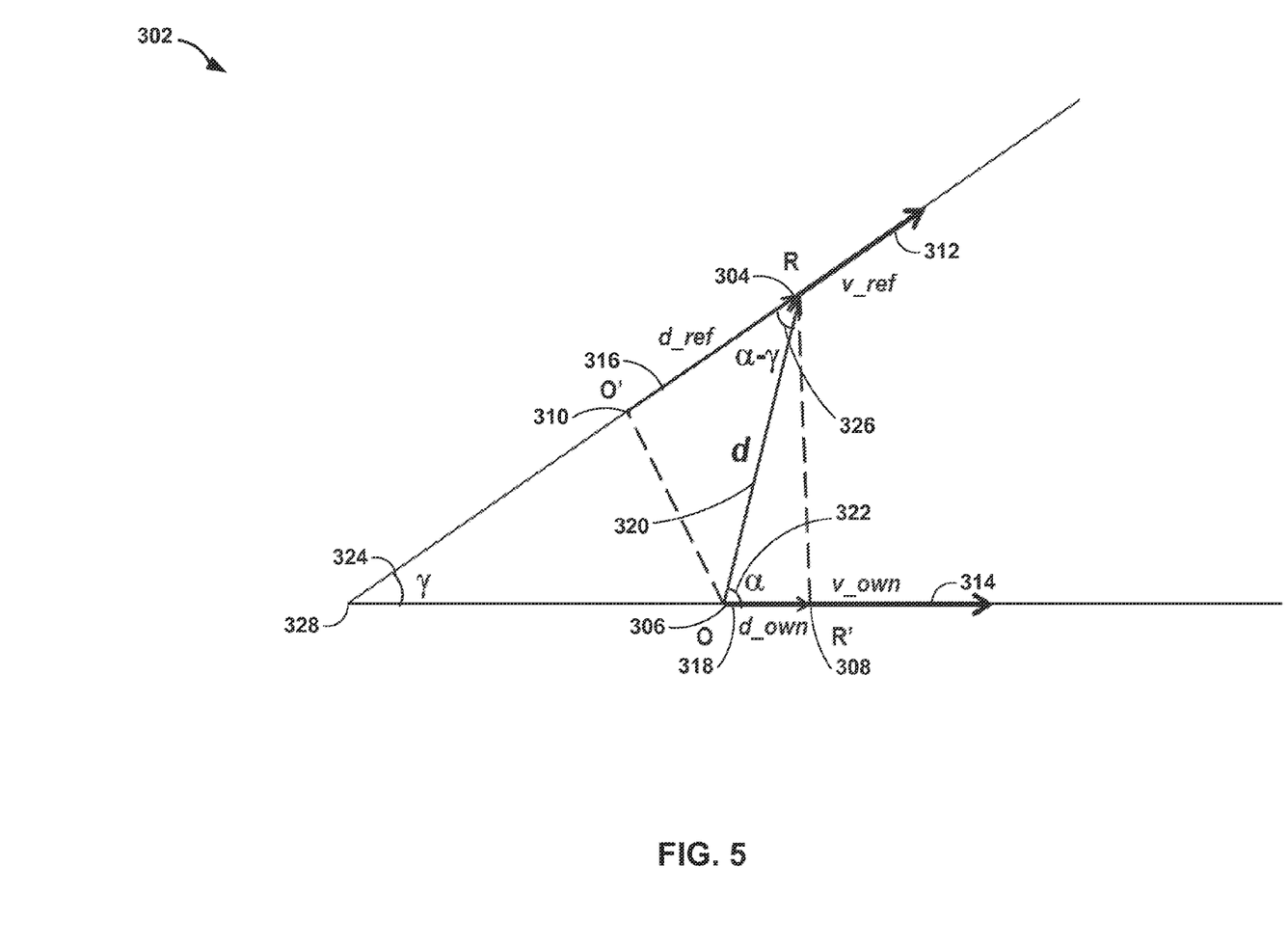
FIG. 5 is a conceptual diagram illustrating an example average time spacing deviations between a current position of an ownship aircraft and a reference point in an aircraft spacing system.

FIG. 5 is a conceptual diagram illustrating an example average time spacing deviation between a current position of an ownship aircraft and a reference point in aircraft spacing system 302. FIG. 5 is described within the context of FIG. 2.

In the example of FIG. 5, aircraft spacing system 302 includes target aircraft's reference position 304 (which corresponds to "R" in FIG. 5), ownship aircraft's current position 306 (which corresponds to "O" in FIG. 5), reference projection 308 (which corresponds to R' in FIG. 5), ownship projection 310 (which corresponds to O' in FIG. 5), reference velocity vector 312 (which corresponds to "v_ref" in FIG. 5), ownship velocity vector 314 (which corresponds to "v_own" in FIG. 5), reference distance 316 (which corresponds to "d_ref" in FIG. 5), ownship distance 318 (which corresponds to "d_own" in FIG. 5), position vector 320 (which corresponds to "d" in FIG. 5), angle alpha 322 (which corresponds to "α" in FIG. 5), angle gamma 324 (which corresponds to "γ" in FIG. 5), angle alpha minus gamma 326 (which corresponds to "α−γ" in FIG. 5), and origin 328.

In the example of FIG. 5, target aircraft's reference position 304 may be the reference position on a past trajectory of the target aircraft (e.g., N seconds earlier or X nautical miles before the target aircraft's current position). Ownship aircraft's current position 306 may be the current position of the ownship aircraft. Reference projection 308 may be the point projected onto the trajectory (e.g., a trajectory based on ownship velocity vector 314) of ownship aircraft's current position 306. Ownship projection 310 may be the point projected onto the prior trajectory of target aircraft's reference position 304. Reference velocity vector 312 may be the velocity vector associated with the target aircraft at target aircraft's reference position 304. Ownship velocity vector 314 may be the velocity vector associated with the ownship aircraft at ownship aircraft's current position 306. Reference distance 316 may be the distance between ownship projection 310 and target aircraft's reference position 304. Ownship distance 318 may be the distance between ownship aircraft's current position 306 and reference projection 308. Position vector 320 may be the distance between ownship aircraft's current position 306 and target aircraft's reference position 304. Angle alpha 322 may be the angle between position vector 320 and ownship velocity vector 314. Angle gamma 324 may be the angle between reference velocity vector 312 and ownship velocity vector 314. Angle alpha minus gamma 326 may be the angle between position vector 320 and the trajectory of target aircraft's reference position 304. Origin 328 may be an origin of coordinates for position vectors in aircraft spacing system 302. In some examples, origin 328 may be an arbitrary reference point.

In the example of FIG. 5, processor 38 may receive positional information including target aircraft's reference position 304 with an associated trajectory, ownship aircraft's current position 306, reference velocity vector 312, and ownship velocity vector 314 from other aircraft 34 and/or ground-based systems 36 via communication system 40, from memory 42, and/or from data sources 44. Responsive to receiving the positional information, processor 38 may project ownship aircraft's current position 306 onto the trajectory associated with reference position 304 to determine ownship projection 310. Additionally, processor 38 may also project target aircraft's reference position 304 onto the trajectory of ownship position 306 (e.g., the trajectory may be based on ownship velocity vector 314) to determine reference projection 308. In other words, processor 38 may use the positional information to project ownship aircraft's current position 306 onto the trajectory of target aircraft's reference position 304 to determine ownship projection 310, and project target aircraft's reference position 304 onto the trajectory of ownship aircraft's current position 306 to determine reference projection 308. In some examples, position vector 320 may also be calculated by processor 38.

For example, to determine ownship projection 310 and reference projection 308, processor 38 may determine reference distance 316, which is the distance between target aircraft's reference position 304 and ownship projection 310, and ownship distance 318, which is the distance between ownship aircraft's current position 306 and reference projection 308. In some examples, processor may determine reference distance 316 using equation (1) and ownship distance 318 using equation (2) as described in FIG. 3, where $r_{ref}$ is target aircraft's reference position vector corresponding to reference position 304 and $r_{own}$ is ownship aircraft's current position vector corresponding to current position 306. For instance, $r_{ref}$ and $r_{own}$ are the position vectors which share any common origin of coordinates (e.g., origin 328). In some examples, processor 38 may determine reference distance 316 using equation (3) and ownship distance 318 using equation (4), where d is position vector 320, angle alpha 322 is the angle between position vector 320 and ownship velocity vector 314 as described in FIG. 5, and angle gamma 324 is the angle between reference velocity vector 312 and ownship velocity vector 314. In addition, angle alpha minus gamma 326 is the difference between angle alpha 322 and angle gamma 324. In some examples, processor 38 may also determine a first time difference ($\Delta t_{ref}$) using equation 5 and a second time difference ($\Delta t_{own}$) using equation 6.

$$\Delta t_{ref} = \frac{d_{ref}}{|\vec{v}_{ref}|} = \frac{(\vec{r}_{ref} - \vec{r}_{own}) \cdot \vec{v}_{ref}}{|\vec{v}_{ref}|^2} \quad (5)$$

$$\Delta t_{own} = \frac{d_{own}}{|\vec{v}_{own}|} = \frac{(\vec{r}_{ref} - \vec{r}_{own}) \cdot \vec{v}_{own}}{|\vec{v}_{own}|^2} \quad (6)$$

In some examples, processor 38 may determine the deviation in time spacing between ownship aircraft's current position 306 and target aircraft's reference position 304 by averaging a first time difference and a second time difference and adding the assigned spacing ($\Delta T$) between the target aircraft and ownship aircraft 32. In the example of FIG. 5, the perspective of ownship aircraft 32 at ownship aircraft's current position 306 is that reference projection 308 is in front of ownship aircraft 32. In the example of FIG. 5, the perspective of the target aircraft at target aircraft's reference position 306 is ownship projection 310 is behind target aircraft's reference position 304. In the example of FIG. 5, processor 38 may calculate the deviation in the time spacing to be a positive value because ownship aircraft's current position 306 is behind target aircraft's reference position 304 by the average of the first time difference and the second time.

Figure 6:
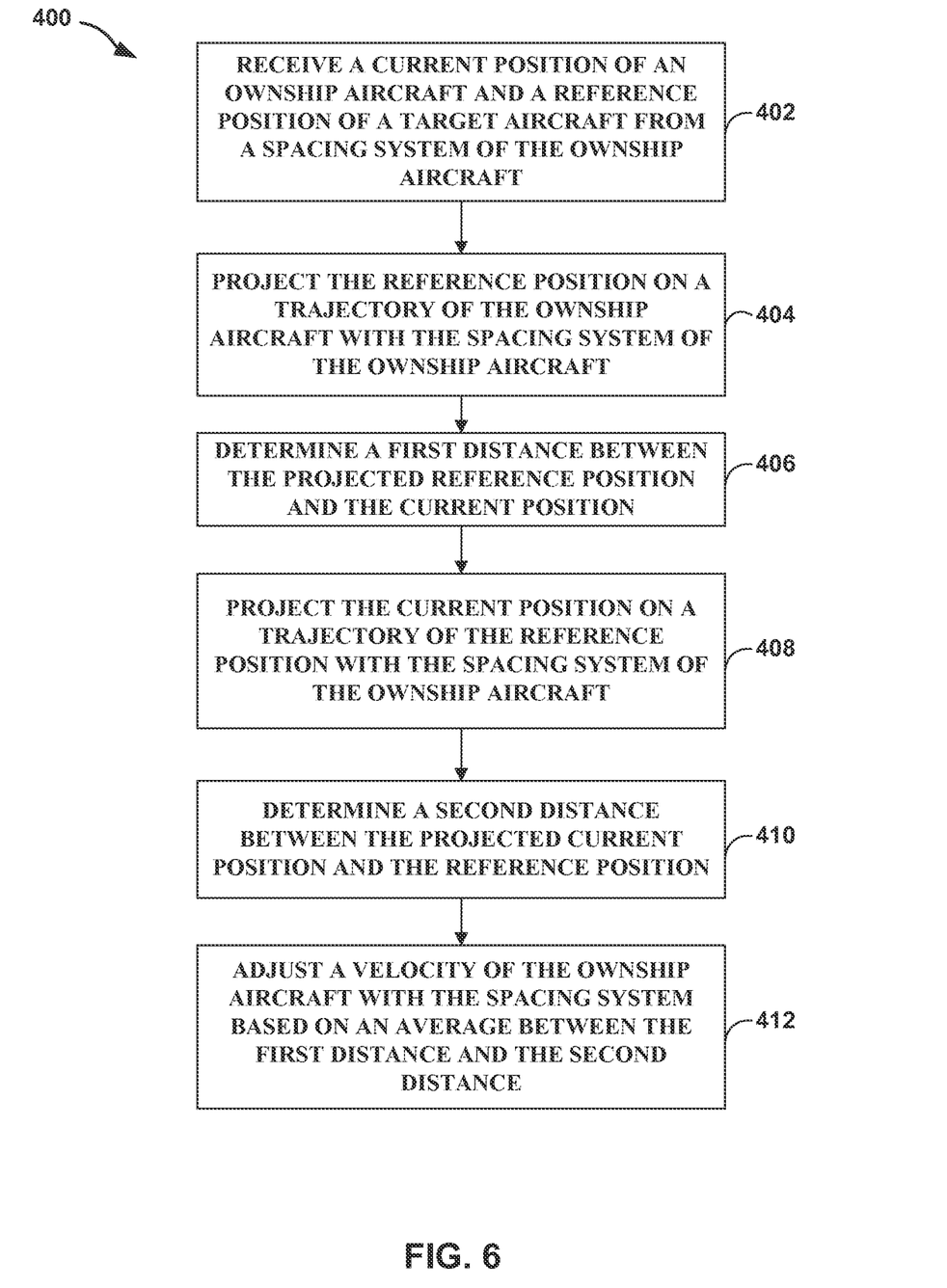
FIGS. 6-7 are flow diagrams illustrating examples of operation of an aircraft spacing system.
Figure 7:
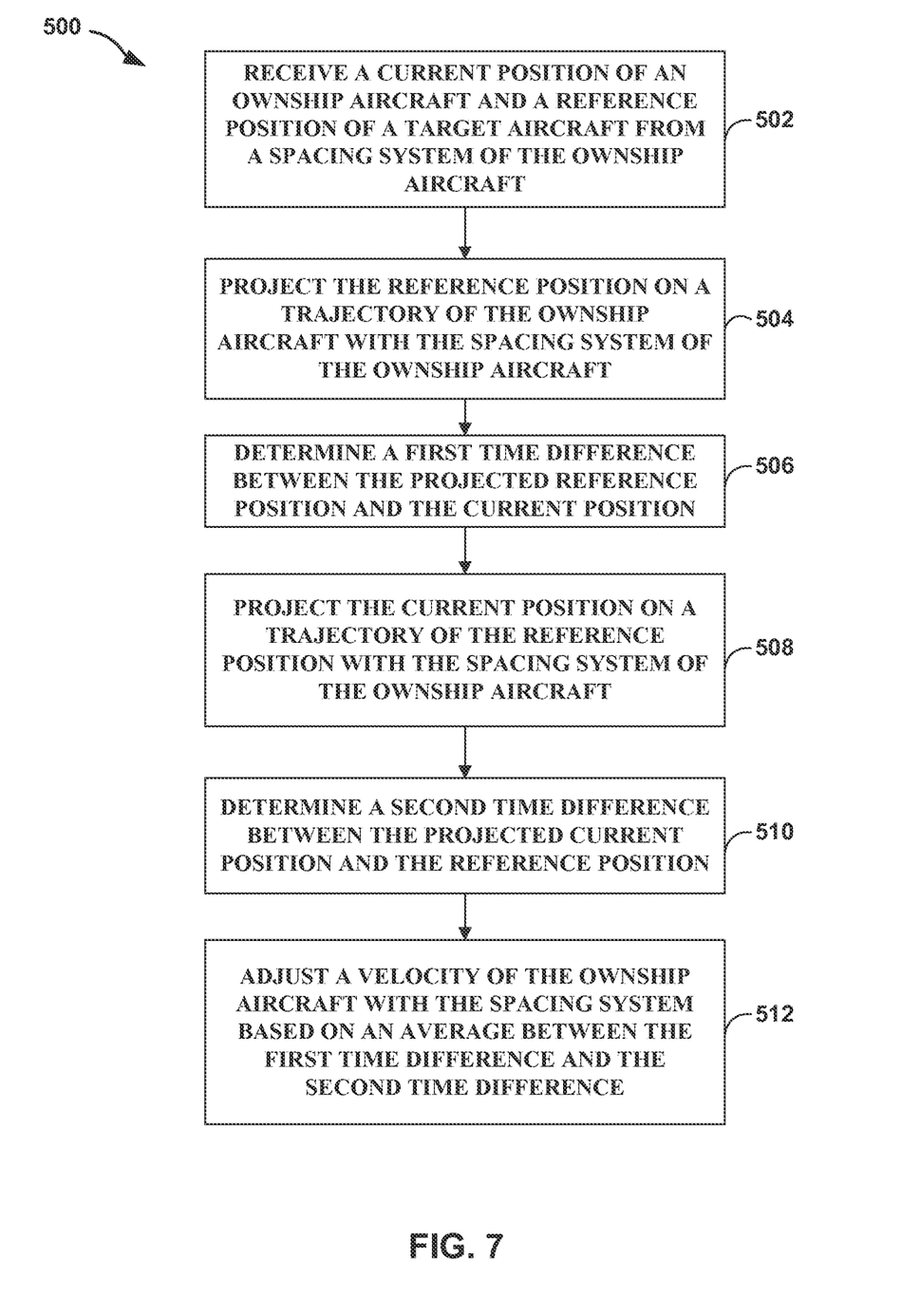

FIGS. 6-7 are flow diagrams illustrating examples of operation of an aircraft spacing system. FIGS. 6-7 are described within the context of FIG. 2.

In the example of FIG. 6, processor 38 may receive a current position of ownship aircraft 32 and a reference position of a target aircraft from one or more other aircraft 34 and/or one or more ground-based systems 36 through communications system 40, from data sources 44, and/or from memory 42 (402). In some examples, the reference position is a position of the target aircraft N seconds or X nautical miles prior to a current position of the target aircraft. In some examples, N is an assigned spacing number according to ASPA-FIM. Processor 38 may project the reference position on a trajectory of the ownship aircraft (404). Processor 38 may determine a first distance between the projected reference position and the current position (406). Processor 38 may project the current position on a trajectory of the reference position (408). Processor 38 may determine a second distance between the projected current position and the reference position (410). Processor 38 may adjust a velocity of the ownship aircraft based on an average between the first distance and the second distance (412).

In the example of FIG. 6, processor 38 may determine the first distance by subtracting the current position of the ownship aircraft from the reference position, applying a dot product of a velocity vector of the reference position, and dividing by a magnitude of the velocity vector of the reference position. Additionally, processor 38 may determine the second distance by subtracting the current position of the ownship aircraft from the reference position, applying a dot product of a velocity vector of the current position, and dividing by a magnitude of the velocity vector of the current position. In other examples, processor 38 may determine the first distance by determining an angle alpha, the angle alpha is an angle between a position vector and a velocity vector of the current position, and applying a cosine of the angle alpha. For instance, the position vector may be between the current position and the reference position. In some examples, processor 38 may determine the second distance by determining an angle alpha minus gamma, the angle alpha minus gamma is an angle of a position vector and a velocity vector of the current position minus the angle between a velocity vector of the reference position and the velocity vector of the current position. In some examples, the position vector is between the current position and the reference position.

In the example of FIG. 7, processor 38 may receive a current position of ownship aircraft 32 and a reference position of a target aircraft from one or more other aircraft 34 and/or one or more ground-based systems 36 through communications system 40, from data sources 44, and/or from memory 42 (502). In some examples, the reference position is a position of the target aircraft N seconds or X nautical miles prior to a current position of the target aircraft. In some examples, N is an assigned spacing number according to ASPA-FIM. Processor 38 may project the reference position on a trajectory of the ownship aircraft (504). Processor 38 may determine a first time difference between the projected reference position and the current position (506). Processor 38 may project the current position on a trajectory of the reference position (508). Processor 38 may determine a second time difference between the projected current position and the reference position (510). Processor 38 may adjust a velocity of the ownship aircraft based on an average between the first time difference and the second time difference (512).

For example, processor 38 may determine the first time difference by subtracting the current position of the ownship aircraft from the reference position, applying a dot product of a velocity vector of the reference position, and dividing by a squared magnitude of the velocity vector of the reference position. In another example, processor 38 may determine the second time difference by subtracting the current position of the ownship aircraft from the reference position, applying a dot product of a velocity vector of the current position, and dividing by a squared magnitude of the velocity vector of the current position. For instance, the assigned time difference is N seconds prior to the current position of the target aircraft.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims.

What is claimed is:

1. A method comprising:
   receiving, by a spacing system of an ownship aircraft, a current position of the ownship aircraft and a reference position of a target aircraft, wherein the reference position is a position of the target aircraft prior to a current position of the target aircraft;
   projecting, by the spacing system of the ownship aircraft, the reference position on a trajectory of the ownship aircraft;
   determining a first distance between the projected reference position and the current position of the ownship aircraft;
   projecting, by the spacing system of the ownship aircraft, the current position of the ownship aircraft on a trajectory of the reference position;
   determining a second distance between the projected current position of the ownship aircraft and the reference position; and
   adjusting, by the spacing system and based on an average between the first distance and the second distance, a velocity of the ownship aircraft.

2. The method of claim 1, wherein determining the first distance comprises:
   subtracting the current position of the ownship aircraft from the reference position;
   applying a dot product of a velocity vector of the reference position; and
   dividing by a magnitude of the velocity vector of the reference position.

3. The method of claim 1, wherein determining the second distance comprises:
   subtracting the current position of the ownship aircraft from the reference position;
   applying a dot product of a velocity vector of the current position of the ownship aircraft; and
   dividing by a magnitude of the velocity vector of the current position of the ownship aircraft.

4. The method of claim 1, wherein determining the first distance comprises:
   determining an angle alpha, wherein the angle alpha is an angle between a position vector and a velocity vector of the current position of the ownship aircraft; and
   applying a cosine of the angle alpha.

5. The method of claim 4, wherein the position vector is between the current position of the ownship aircraft and the reference position.

6. The method of claim 1, wherein determining the second distance comprises:
   determining an angle alpha minus gamma, wherein the angle alpha minus gamma is an angle of a position vector and a velocity vector of the current position of the ownship aircraft minus the angle between a velocity vector of the reference position and the velocity vector of the current position of the ownship aircraft; and
   applying a cosine of the angle alpha minus gamma.

7. The method of claim 6, wherein the position vector is between the current position of the ownship aircraft and the reference position.

8. A method comprising:
   receiving, by a spacing system of an ownship aircraft, a current position of the ownship aircraft and a reference position of a target aircraft, wherein the reference position is a position of the target aircraft prior to a current position of the target aircraft;

projecting, by the spacing system of the ownship aircraft, the reference position on a trajectory of the ownship aircraft;

determining a first time difference between the projected reference position and the current position of the ownship aircraft;

projecting, by the spacing system of the ownship aircraft, the current position of the ownship aircraft on a trajectory of the reference position;

determining a second time difference between the projected current position of the ownship aircraft and the reference position; and adjusting, by the spacing system and based on an average between the first time difference and the second time difference, a velocity of the ownship aircraft.

9. The method of claim 8, wherein determining the first time difference comprises:

subtracting the current position of the ownship aircraft from the reference position;

applying a dot product of a velocity vector of the reference position; and dividing by a squared magnitude of the velocity vector of the reference position.

10. The method of claim 8, wherein determining the second time difference comprises:

subtracting the current position of the ownship aircraft from the reference position;

applying a dot product of a velocity vector of the current position of the ownship aircraft; and dividing by a squared magnitude of the velocity vector of the current position of the ownship aircraft.

11. A spacing system comprising:

a spacing module located on an ownship aircraft, wherein the spacing module is configured to:

receive a current position of the ownship aircraft and a reference position of a target aircraft, wherein the reference position is a position of the target aircraft N seconds prior to a current position of the target aircraft;

project the reference position on a trajectory of the ownship aircraft;

determine at least one of a first distance or a first time difference between the projected reference position and the current position of the ownship aircraft;

project the current position of the ownship aircraft on a trajectory of the reference position;

determine at least one of a second distance or a second time difference between the projected current position of the ownship aircraft and the reference position; and adjust a velocity of the ownship aircraft based on an average between at least one of the first distance and the second distance or the first time difference and the second time difference.

12. The system of claim 11, wherein to determine the first distance, the spacing module is further configured to:

subtract the current position of the ownship aircraft from the reference position;

apply a dot product of a velocity vector of the reference position; and divide by a magnitude of the velocity vector of the reference position.

13. The system of claim 11, wherein to determine the second distance, the spacing module is further configured to:

subtract the current position of the ownship aircraft from the reference position;

apply a dot product of a velocity vector of the current position of the ownship aircraft; and divide by a magnitude of the velocity vector of the current position of the ownship aircraft.

14. The system of claim 11, wherein to determine the first distance, the spacing module is further configured to:

determine an angle alpha, wherein the angle alpha is an angle between a position vector and a velocity vector of the current position of the ownship aircraft; and apply a cosine of the angle alpha.

15. The system of claim 11, wherein to determine the second distance, the spacing module is further configured to:

determine an angle alpha minus gamma, wherein the angle alpha minus gamma is an angle of a position vector and a velocity vector of the current position of the ownship aircraft minus an angle between a velocity vector of the reference position and the velocity vector of the current position of the ownship aircraft; and apply a cosine of the angle alpha minus gamma.

16. The system of claim 11, wherein to determine the first time difference, the spacing module is further configured to:

subtract the current position of the ownship aircraft from the reference position;

apply a dot product of a velocity vector of the reference position; and divide by a squared magnitude of the velocity vector of the reference position.

17. The system of claim 11, wherein to determine the second time difference, the spacing module is further configured to:

subtract the current position of the ownship aircraft from the reference position;

apply a dot product of a velocity vector of the current position of the ownship aircraft; and divide by a squared magnitude of the velocity vector of the current position of the ownship aircraft.

* * * * *